United States Patent
Eberle et al.

(10) Patent No.: US 11,029,401 B2
(45) Date of Patent: Jun. 8, 2021

(54) APPARATUS AND METHOD FOR DETECTING A TRAFFIC PARTICIPANT

(71) Applicant: HENSOLDT SENSORS GMBH, Taufkirchen (DE)

(72) Inventors: Matthias Eberle, Ulm (DE); Horst Mayer, Illerkirchberg (DE)

(73) Assignee: HENSOLDT SENSORS GMBH, Taufkirchen (DE)

( * ) Notice: Subject to any disclaimer, the term of this patent is extended or adjusted under 35 U.S.C. 154(b) by 363 days.

(21) Appl. No.: 15/979,697

(22) Filed: May 15, 2018

(65) Prior Publication Data
US 2018/0335515 A1 Nov. 22, 2018

(30) Foreign Application Priority Data
May 16, 2017 (EP) .................................... 17171349

(51) Int. Cl.
  *G01S 13/86* (2006.01)
  *G01S 13/87* (2006.01)
  (Continued)

(52) U.S. Cl.
  CPC .............. *G01S 13/86* (2013.01); *B60Q 1/525* (2013.01); *G01S 5/0027* (2013.01); *G01S 13/42* (2013.01);
  (Continued)

(58) Field of Classification Search
  CPC ...... G05D 1/0061; B60Q 1/525; G08G 1/166; G08G 3/02; G08G 5/0021; G08G 5/04;
  (Continued)

(56) References Cited

U.S. PATENT DOCUMENTS 7,554,484 B2   6/2009 Zimmermann et al.
2011/0285573 A1 11/2011 Jeong

FOREIGN PATENT DOCUMENTS

DE        10011263 A1    9/2001
WO      2016190941 A2   12/2016

OTHER PUBLICATIONS

Henrich et al., "Data Fusion for the new German F124 Frigate Concept and Architecture," Proceedings of the Sixth International Conference of Information Fusion, Feb. 2003, vol. 2.
(Continued)

*Primary Examiner* — Dao L Phan
(74) *Attorney, Agent, or Firm* — Patent Portfolio Builders PLLC (57) ABSTRACT

An apparatus for detecting a traffic participant includes a first detection device for detecting the traffic participant in a first detection zone. The first detection device is configured to repeatedly detect the first detection zone and to detect an entering of a traffic participant in the first detection zone, and/or to detect the traffic participant in an angular section in an extended first detection zone beyond the first detection zone according to an instruction. The apparatus also includes a second detection device that detects the traffic participant in a second detection zone, and is adapted to provide data required for instruction about the traffic participant in response to the detection of the traffic participant and to forward it to the first detection device for instruction. This way, the traffic participant may be detected by the first detection device before entering the first detection zone.

13 Claims, 6 Drawing Sheets

(51) Int. Cl.
| | |
|---|---|
| *G08G 5/00* | (2006.01) |
| *G08G 5/04* | (2006.01) |
| *G01S 13/78* | (2006.01) |
| *G08G 1/16* | (2006.01) |
| *G08G 3/02* | (2006.01) |
| *G01S 5/00* | (2006.01) |
| *G01S 13/42* | (2006.01) |
| *G01S 13/933* | (2020.01) |
| *B60Q 1/52* | (2006.01) |
| *G01S 13/93* | (2020.01) |
| *G05D 1/00* | (2006.01) |
| *G01S 13/931* | (2020.01) |
| *G01S 13/02* | (2006.01) |

(52) U.S. Cl.
CPC .......... *G01S 13/781* (2013.01); *G01S 13/872* (2013.01); *G01S 13/93* (2013.01); *G01S 13/933* (2020.01); *G05D 1/0061* (2013.01); *G08G 1/166* (2013.01); *G08G 3/02* (2013.01); *G08G 5/0021* (2013.01); *G08G 5/04* (2013.01); *G01S 13/931* (2013.01); *G01S 2013/0245* (2013.01)

(58) Field of Classification Search
CPC ...... G01S 5/0027; G01S 13/42; G01S 13/781; G01S 13/86; G01S 13/872; G01S 13/93; G01S 13/933
See application file for complete search history.

(56) References Cited

OTHER PUBLICATIONS

Huizing et al., "An Efficient Scheduling Algorithm for a Multifunction Radar," IEEE International Symposium on Phased Array Systems and Technology, Oct. 15-18, 1996, Boston, MA, US.

Search Report dated Nov. 30, 2017 in related EP Application No. 17171349.8 (reference WO 2016/190941 previously cited in IDS dated May 15, 2018).

APPARATUS AND METHOD FOR DETECTING A TRAFFIC PARTICIPANT

CROSS-REFERENCE TO RELATED APPLICATION

The present application claims priority under 35 U.S.C. § 119 to European patent application EP 17 171 349.8, filed May 16, 2017, the entire disclosure of which is herein expressly incorporated by reference.

FIELD OF THE INVENTION

Exemplary embodiments of the present invention relate to an apparatus and a method for detecting one or more traffic participant(s) and in particular to a sensor controller for range extension to detect approaching vehicles.

BACKGROUND OF THE INVENTION

Conventionally, a variety of different sensor types are used for detecting approaching vehicles (e.g., from the own vehicle) depending on the use case. These sensors can be distinguished as cooperating and non-cooperating sensors.

Cooperating sensors actively publish their position and maybe also other data like speed/identification using corresponding communication devices (e.g., wirelessly). The TCAS (Traffic Alert and Collision Avoidance System) and the successor product ACAS X (Airborne Collision Avoidance System) for aircrafts are examples of cooperating sensors. Both systems exchange data between each other using transponders. Furthermore, the ADS-B system (Automatic Dependent Surveillance-Broadcast)) is also a cooperating sensor for aircrafts. For water vehicles, the AIS (Automatic Identification System) has established as a standard in order to exchange navigation and position data. Communication standards for land vehicles are currently in development, such as the DAB-Plus traffic radio.

In contrast to cooperating sensors, non-cooperating sensors, for example a radar, can detect approaching vehicles in a completely autonomous way. In particular, no communication apparatus of any type is required.

Figure 6:
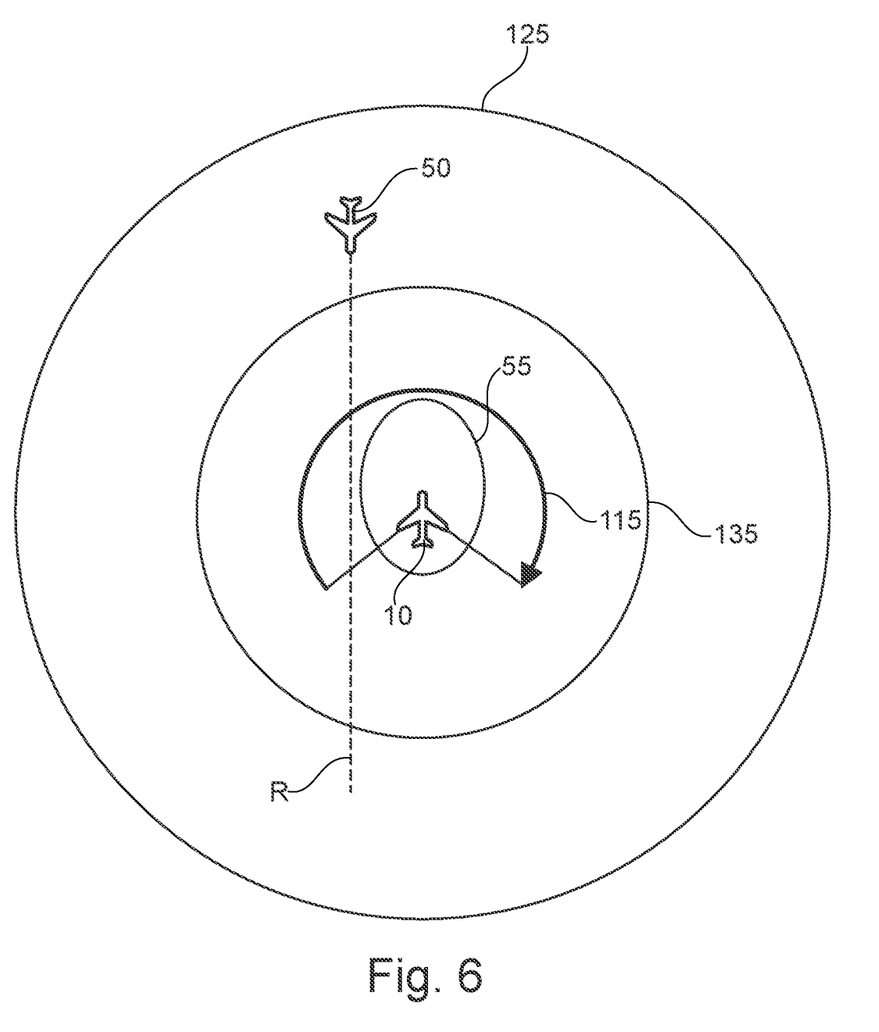
FIG. 6 illustrates the conventional AESA radar system, where the scan beam may be electronically swiveled, and which may be used in exemplary embodiments.

FIG. 6 illustrates a so-called Active Electronically Scanned Array (AECA) radar, in which the scan beam is electronically swiveled and the radar antenna may be mounted in the vehicle structure in a rigid or movable way. For example, the radar scan beam may be continuously swiveled in the clockwise direction during a scan cycle, so that the outer boundary 115 of the radar scan area comprises at least a collision avoidance zone 55 in order to be able to reliably detect any exemplary non-cooperating (that is, which are not equipped with ADS-B or a transponder) aircrafts. This is the minimum requirement to radar. However, possible radar targets out of the collision avoidance zone 55 may also be detected.

Because cooperating sensors, as for example an ADS-B, may also deliver wrong information due to a system error or a hacker attack, the data of cooperating sensors are to be acknowledged by at least one other independent sensor. PCT patent publication WO 2016/190941 A2 discloses a possible method for aircrafts to validate sensor data of a sensor by using a second sensor. In general, the disclosed validation is always initiated when the aircraft detected by the first sensor is located in the collision avoidance zone 55. This has the following drawbacks:

An acknowledgment of the sensor data for approaching aircrafts outside of the collision avoidance zone 55 is not possible. Thus, the situation overview of the pilot(s) is not enhanced outside of the collision avoidance zone 55. In addition, the sensor data should not be used in an automatic/autonomous system for keeping the pre-defined minimum values for the horizontal and vertical staggering distances between aircrafts.

The second sensor has to be explicitly instructed for each aircraft to be examined. Thus, in case the first sensor fails, it is no longer able to detect approaching aircrafts. Sensor failure refers to non-reporting of data and also to reporting of erroneous data. In this case, no data are existing, and the collision warning does not work anymore.

In addition, no overload protection for the second sensor is provided, in case the number of positions of approaching vehicles (and which have to be validated) transmitted to the second sensor may not be processed within one cycle using the existing computing capacities.

The first sensor has to be on board of the aircraft, which may not always be guaranteed. It also may be provided on ground, as for example in TIS-B (Traffic Information System-Broadcast): Here, ground stations provide position data of aircraft, which is based on ADS-B ground stations and radar. A cooperation with these systems is not intended.

Sensor performance is not monitored.

The current situation is thus not satisfactory and there is a demand for a detection apparatus, which addresses at least some of these disadvantages.

SUMMARY

Exemplary embodiments of the present invention relate to an apparatus for detecting one or more traffic participant(s). The apparatus comprises a first detection device for detecting the traffic participant in a first detection zone. The first detection device is configured to repeatedly scan the first detection zone and to detect an entering of a traffic participant in the first detection zone and after being instructed to detect the traffic participant in an angular section in an enlarged first detection zone beyond the first detection zone (cued search). The apparatus further comprises a second detection device for detecting the traffic participant in a second detection zone, wherein the second detection device is configured to provide the data about the traffic participant for instructing after detection of the traffic participant and to transmit to the first detection device for instruction, so that the traffic participant may be detected by the first detection device before entering the first detection zone. Hereto, the first detection zone is located at least partly within the second detection zone or the second detection device has at least in one direction (e.g. in the forward direction) a significant larger range (e.g., more than double or three times so far) as the first detection device.

It is understood that exemplary embodiments of the present invention shall not be limited to a single traffic participant, which has to be detected, but the one traffic participant may always be one of several traffic participants, which may be entirely or partly detectable.

The data used for instruction may, for example, indicate (or specify) a direction of instruction towards the traffic participant or the position of the traffic participant, and the angular section may be selected in a way, that the direction of the position is arranged in said angular section.

The second detection device may comprise at least one cooperating sensor, which is configured to detect the traffic participant based on data sent from the traffic participant. In general, sending comprises an active sending and not only a reflection of signals. For example, the second detection device may comprise at least one of the following sensors: an ADS-B system, a transponder, an AIS system, or a DAB-Plus system. It is also possible to use a non-cooperating sensor for the second detection device.

The first detection device may comprise at least one non-cooperating sensor, in particular a radar including an electronic beam swiveling, which is adapted to detect the traffic participant independent of whether the traffic participant is or is not sending data.

Exemplary embodiments thus comprise sensors, which may receive instructions (as part of the first detection device), which are able to detect objects in a targeted way based on instruction data, and namely with a higher sensitivity or range than without instruction. Thus, the first detection device may, for example, be a radar system, which is able to detect predetermined angular sections or positions in the extended first detection zone in a targeted way. In this regard, a MIMO (Multiple Input Multiple Output) antenna array may be used, for example, which is directed to respective information from the second detection device. The second detection device may, for example, be a transponder system or may be one of the cooperating sensors mentioned before in the background section and in particular may comprise an ADS-B system. The device may be installed in a stationary or also mobile way on an own vehicle, wherein the own vehicle or the traffic participant may be of any kind, and in particular may comprise an aircraft, a water vehicle, and a land vehicle.

Optionally, the apparatus further comprises a controller (e.g. a radar management unit, RME), which is adapted to provide at least one of the following features:
  Synchronizing detection signals of the first detection unit and/or of the second detection unit in time,
  Assigning traffic participants to detected detection signals,
  Performing a selection and/or data fusion of the data used for instruction (e.g., in case the second detection device comprises at least two different sensors, which provide different sensor data);
  Selecting traffic participants, which are to be selectively detected by the first detection device in the limited angular section.

Optionally, the controller may further be configured to perform a determination of candidates, for which an instruction has to be performed (e.g., as part of the selection of traffic participants), wherein the determination comprises at least one of the following:
  Identification of a candidate list of candidates for which an instruction has to be selectively performed,
  Evaluating each of the elements of the candidate list using a cost function,
  Sorting the candidate list based on the evaluation (e.g., top 3, 5, or 10),
  Forwarding the candidates that are most weighted by the cost function to the first detection device in order to perform an instruction of the most weighted candidates.

Optionally, the apparatus comprises a warning device adapted to display a traffic participant that has been detected by the first detection device in the extended detection zone by outputting a warning. In the simplest case, the warning may comprise displaying the traffic participant and may be activated in particular in a case (or only then), when there is a potential risk of collision. Thus, the warning device may include a display adapted to display the traffic participant at a detection in the extended first detection zone.

The technique described may also be used for other sensor types instead of the exemplary radar, which include the following examples:
  Optical sensors including a zoom lens: The lens is directed to the position, which is transmitted from the second detection device and is then zoomed towards this direction (optically enlarged). In addition, information of the second detection device may be used for focusing the optical sensor.
  Infrared sensor including a zoom lens: The lens is directed to the position, which is transmitted from the second detection device and is then zoomed towards this direction (optically enlarged). In addition, information of the second detection device may be used for focusing the optical sensor.
  Directional microphone: The microphone will be directed towards the direction transmitted by the second detection device for a longer time, thus the acoustic signal may be integrated for a longer time, and the useful signal is better distinguished from the statistic noise.

Unless otherwise mentioned, by way of example, reference is made to a radar sensor as the first sensor device in the following.

The present invention also relates to a collision avoidance system including one of the apparatus described above. The collision avoidance system may for example refer to a traffic participant, as for example an aircraft and/or a ship and/or a land vehicle. Optionally, based on the detection, the collision avoidance system may propose alternative routes (e.g. in the display) and/or start an alternative route in an autonomous way.

The present invention also relates to a method for detecting a traffic participant using a detection apparatus comprising first and second detection devices, wherein the first detection device is able to repeatedly detect a first detection zone, and to detect an entering of a traffic participant into the first detection zone. The method comprises the steps:
  a) Detecting the traffic participant in a second detection zone by a second detection device;
  b) In response to the detection of the traffic participant, providing instruction data about the traffic participant;
  c) Instructing the first detection device by transmitting the instruction data to the first detection device; and
  d) In response to the instruction, detecting the traffic participant by the first detecting device in the extended first detection zone, so that the traffic participant may be detected before entering the first detection zone by the first detection device.

It is understood that steps b) or d) may be immediately performed after detection a) or instruction c) or after a waiting time, or even then, when the traffic participant fulfills a further condition (e.g. moves within a predetermined range or with a predetermined speed).

Optionally, the method comprises one of the following steps:
  Synchronizing detection signals from the first detected device and/or the second detection device,
  Assigning traffic participants to the detected detection signals,
  In case a second detection device comprises at least two different sensors providing different detection data, selecting and/or combining of the data used for instruction by the second detection device, Selection of traffic participants, which are to be selectively detected by the first detection device in a limited angular section.

The method (e.g., the selection step) may at least comprise one of the following steps:

Creating a candidate list of candidates, for which an instruction is to be selectively performed, Evaluating each element of the candidate list by using a cost function, Sorting the candidate list based on the evaluation, Forwarding the candidates that are most weighted by the cost function to the first detection device in order to perform an instruction to these targets here.

An evaluation using the cost function may take different parameters of the traffic participants into account, as for example distance, speed, height, etc.

This method or at least parts thereof may also be implemented as instructions in software or may be implemented in a computer program product, whereby stored instructions are able to perform the steps of according to the method, when the method is executed on a processor. Thus, the present invention also relates to a computer program product including software code (software instructions), which is stored thereon and which is configured to perform one of the methods described above, in case the software code is executed by a processing unit. The processing unit may be any kind of computer or controller, which comprises a respective microprocessor, which is adapted to execute software code.

Exemplary embodiments offer the following advantages for example:

Earlier detection of erroneous or manipulated cooperating communication signals.

Expansion of the radar range in order to achieve a better situation overview for the driver.

A targeted and timely instruction to targets in the collision avoidance range in order to enhance the precision of the position, speed, and also acceleration data, if required.

BRIEF DESCRIPTION OF THE FIGURES

The exemplary embodiments of the present invention will be better understood by means of the following detailed description and the appended figures of the different exemplary embodiments. However, they shall not be interpreted in a way limiting the disclosure of the specific embodiments, but they are only intended as description and to enhance understanding.

DETAILED DESCRIPTION

Figure 1:
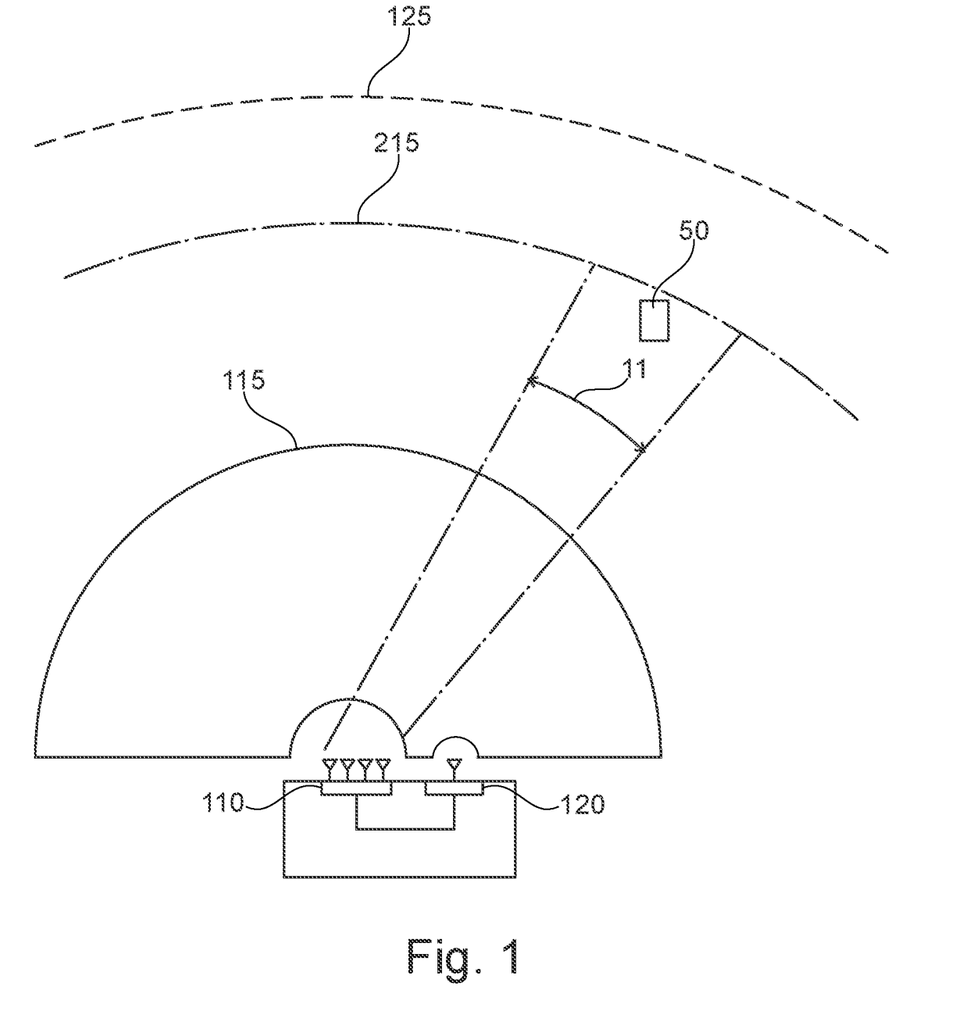
FIG. 1 illustrates an apparatus for detecting a traffic participant according to an exemplary embodiment of the present invention.

FIG. 1 illustrates an apparatus adapted to detect one or more traffic participant(s) 50. The apparatus comprises a first detection device 110 for detecting the traffic participant 50 in a first detection zone 115. The first detection device 110 is configured to repeatedly detect the first detection zone 115 and to detect an entering of a traffic participant 50 into the first detection zone 115, and/or to detect the traffic participant 50 in an angular section 11 in an extended first detection zone 215 beyond the first detection zone 115 after an instruction (or a cue). The apparatus also comprises a second detection device 120 for detecting the traffic participant 50 in a second detection zone 125, the second detection device 120 is configured to provide, in response to the detection of the traffic participant 50, the data about the traffic participant 50 required for instruction and to transmit the data to the first detection device 110 for instruction. This way, the traffic participant 50 may be detected by the first detection device 110 before entering the first detection zone 115.

Exemplary embodiments thus enable sensors, which may be instructed (e.g., electronically controlled AESA radar devices, but also optical or acoustical sensors) to selectively instruct the exemplary radar beam (by using a so-called single cued search) to predetermined targets during or after routine scanning of the exemplary radar monitoring zone 115 (see FIG. 6).

The illustrated apparatus may, for example, be part of a system for vehicles in order to detect other approaching vehicles 50. Here, the driver is presented corresponding information in order to prevent an impending collision or any further approaching by means of an evasive action. The information may also be used in a system, which is acting autonomously, to prevent an impending collision or a further approaching (e.g., by evasive actions, which are performed autonomously).

Exemplary embodiments may be used, for example, for aircrafts, land vehicles, as well as for water vehicles, amongst others. In addition, exemplary embodiments may be used for reviewing communication and sensor technology.

Figure 2:
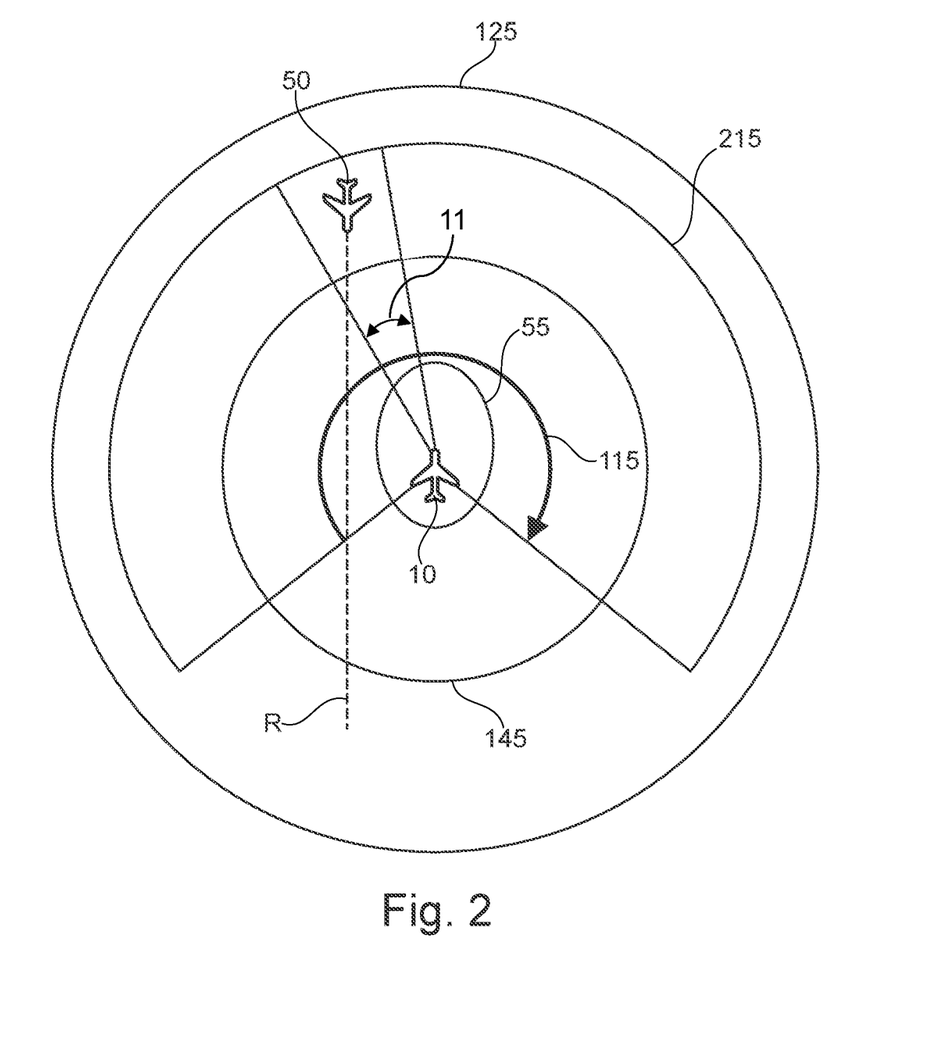
FIG. 2 illustrates the functioning of exemplary embodiments including further optional details.

FIG. 2 illustrates the functioning of exemplary embodiments and includes further optional details. The exemplary embodiment shown is, for example, a system installed in a separate vehicle 10 (e.g., an airplane) and is adapted to detect a traffic participant 50 (e.g., another airplane) moving on a trajectory R. The detection apparatus is installed on the own vehicle 10 and periodically scans the first detection zone 115, for example using a radar. The largest part of the collision avoidance zone 55 is located within the first detection zone 115 for which it always has to be ensured that an entering traffic participant 50 is reliably detected in this area, thus the evasive action may be initiated in time.

In order to obtain information about such a traffic participant 50 in time, the traffic participant 50 is detected within the second detection zone 125 by a second detection device 120 (e.g. an ADS-B system). The second detection device 120 may include a cooperating sensor, which gains information from the traffic participant 50, which enables to detect the position of the traffic participant 50 or at least the instruction direction towards the traffic participant 50 and to forward it to the first detection device 110 in the own vehicle 10.

Furthermore, the exemplary embodiment of FIG. 2 comprises further sensors 141, which are able to detect a further detection zone 145, for example. This further detection zone 145 may, for example, be covered by a transponder system located in the traffic participant 50. The further sensors (e.g., FLARM or an optical system) may also be part of the second detection device 120, which means the second detection device 120 does not need to be (but may be) a self-contained system. It may comprise a plurality of sensors arranged on different positions and which may work in a more or less independent way.

The instruction of the exemplary radar system 110 towards the direction or the position of the traffic participant 50 by the second detection device 120 comprises data, for example, which specifies the angular section 11. Thus, the exemplary radar system 110 is also able to detect the entering traffic participant 50. The direction-dependent radar detection enables coverage of an extended first detection zone 215 in which the traffic participant 50 may be detected by the radar system 110.

The monitoring zone (first detection zone 115) of the radar comprises the collision avoidance zone 55 or parts thereof. According to exemplary embodiments, the radar zone 115 may be significantly enlarged beyond the collision avoidance zone 55 to the extended first detection zone 215 ("cued search"). The exemplary ADS-B system 121 supports, for example, a very large range, which may comprise a distance of up to 150 nautical miles or 277 km. The transponder system, as another sensor, may have an exemplary range of about 26 km (in the A or C mode). The exemplary radar may have a range of 10 km, for example, but may also be extended by instruction beyond the exemplary ADS-B system. For example, the mentioned extended first detection zone 215 may enlarge or exceed the first detection zone 115 in the angular section 11 a multiple of times (e.g. 2 times, 3 times, 4 times, . . . ).

If the radar includes an automatic target tracking, in the best case, it only has to be instructed for a predetermined vehicle 50 once in this way. It then autonomously tracks the vehicle 50 within the complete radar coverage area for future detection cycles—even if the vehicle 50 is located outside of the monitoring zone (first detection zone 115).

Furthermore, exemplary embodiments enable immediate initiation of a maneuver for restoring the distances (separation) between both vehicles 10, 50 corresponding to the valid traffic rules (in an autonomous way), after the position and the speed of the approaching vehicles 50 have been acknowledged by the radar. This significantly enhances security as many vehicles may have to be taken into account, thus the detection of them as early as possible provides considerable advantages concerning security.

Exemplary embodiments may be implemented in particular as follows:
- As extension module for an existing collision avoidance system, or
- As a module, which is completely integrated in the collision avoidance system.

Figure 3:
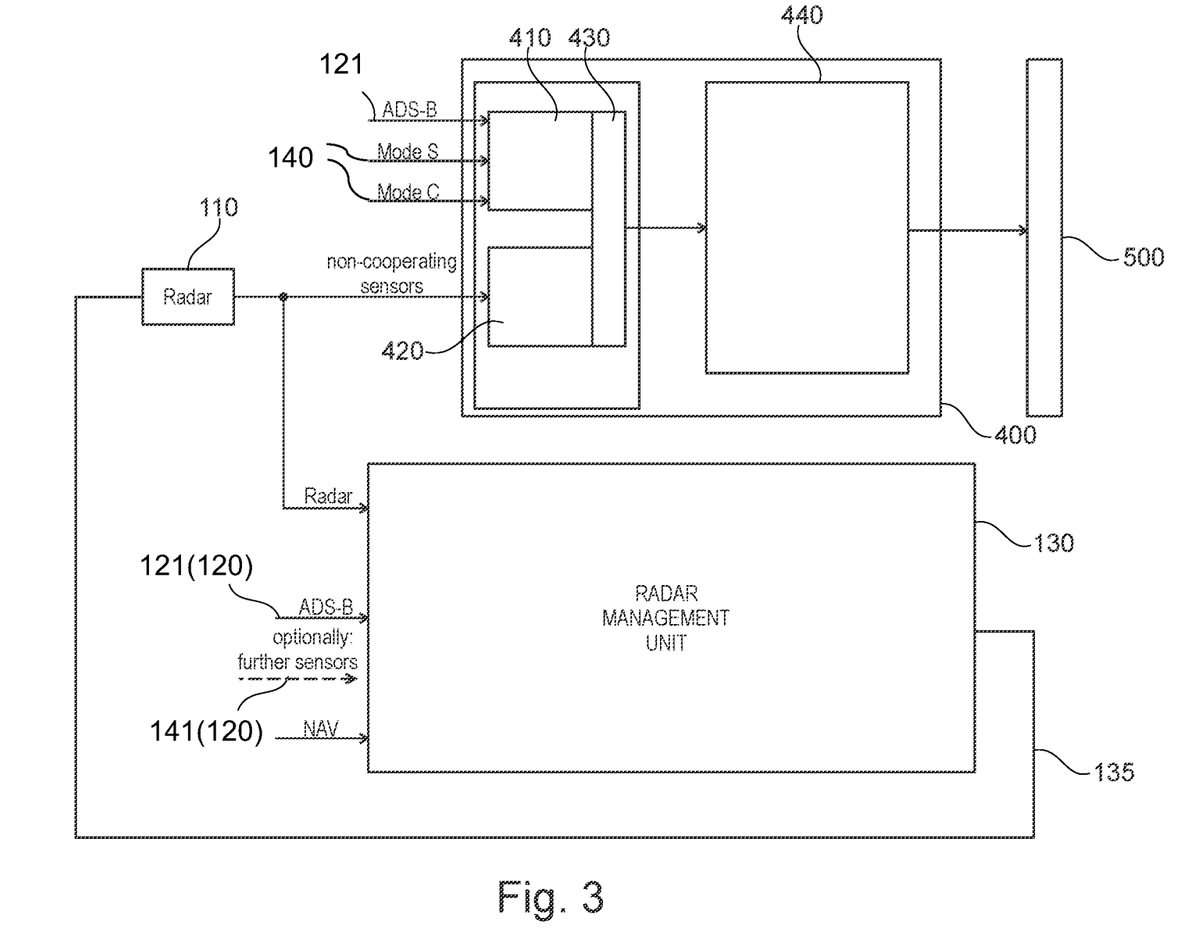
FIG. 3 illustrates by way of example an exemplary embodiment of a radar control system for collision avoidance including an integrated apparatus according to exemplary embodiments.

FIG. 3 shows an exemplary embodiment of the radar control and collision avoidance system, which comprises the ACAS Xu system 400 for aircrafts and a radar management unit 130 as an example. In the illustrated exemplary embodiment, the first detection device 110 is a radar system, which as a non-cooperating sensor transmits respective sensor signals to the ACAS Xu system 400 and to the radar management unit 130 (RME). In addition, the ACAS Xu system 400 receives sensor signals from the exemplary ADS-B system 121 as part of the second detection device and from a transponder system 140, which may be present as a further cooperating sensor.

The system 400 comprises an evaluation unit 410 for cooperating sensors, which receives and evaluates sensor signals of the cooperating sensors 121, 140. In addition, the system 400 comprises a further evaluation unit 420 for non-cooperating sensors, wherein the radar signals are transmitted as non-cooperating sensor signals to the unit. In addition, the system 400 comprises a correlation processing unit 430, which determines trajectories R of the traffic participants based on sensor signals of the cooperating sensors 121, 140 and the non-cooperating sensors 110 and forwards them to a calculation unit 440. The calculation unit 440 evaluates the determined paths regarding possible vertical collisions and also horizontal collisions and returns instructions of to prevent potential collisions, or whether there is any risk of a potential collision at all. The results may be output using the (optical or acoustic) display 500 to an exemplary pilot or driver. In addition, it is also possible to have an autopilot performing the calculated collision avoidance actions.

In the exemplary embodiment of FIG. 3, the radar signals are also transmitted in the radar management unit 130 together with the sensor signals of the sensors 121, 141. The sensors 121, 141 transmit the position or at least the instruction direction to the traffic participant 50. By means of a feedback 135 to the radar system 110, an instruction of the radar system 110 may be performed in order to detect the angular section 11 for the extended first detection zone 215 (see FIG. 2).

The collision avoidance system 400 thus receives data from ADS-B 121, a transponder 140 (mode S and mode C) and a non-cooperating sensor 110, thus the exemplary pilot may be informed by means of a corresponding traffic situation overview based on the data, and may be acoustically warned, if required. Further, respective collision avoidance actions will be calculated by the calculation unit 440 and forwarded to the autopilot, if required. For example, as a non-cooperating sensor 110 an AESA radar may be used, which enables to selectively instruct the radar to detected vehicles 15 by means of the radar management unit 130.

As the radar 110 autonomously monitors the collision avoidance zone 55 in order to be able to detect any non-cooperating vehicles in a reliable way, it only has to be instructed to targets 50 outside of the collision avoidance zone 55 (see FIG. 2). Optionally, an instruction to targets 50 in the collision avoidance zone 55 may be performed to enhance a precision of a position.

In further exemplary embodiments, no ATS-B receiver is used, but another sensor and/or additional sensors 141 are used, which provide identical or comparable features, which however may also be non-cooperating.

In addition, NAV data may be transmitted to the radar management unit 130. The NAV data, i.e., navigation data, include, for example, position and state information regarding the own vehicle 10 (e.g., the degree of longitude, the degree of latitude, the barometric height, the Global positioning system (GPS) height, the vertical velocity, . . . ). The coordinate systems of the sensor data are converted using this information. Typically, radar data is specified in relation to the own vehicle 10. However, ADS-B data is determined in the absolute coordinate system degree of longitude/degree of latitude/height. In order to compare both sensors, the position of the own vehicle 10 has to be known. A higher precision may be achieved using speed information of the own vehicle 10.

Further, the flight position of the own vehicle 10 is required to perform a coordinate transformation for the radar data being fixedly part of the aircraft, for example the role angle or the angle of side-slip of the aircraft.

Figure 4:
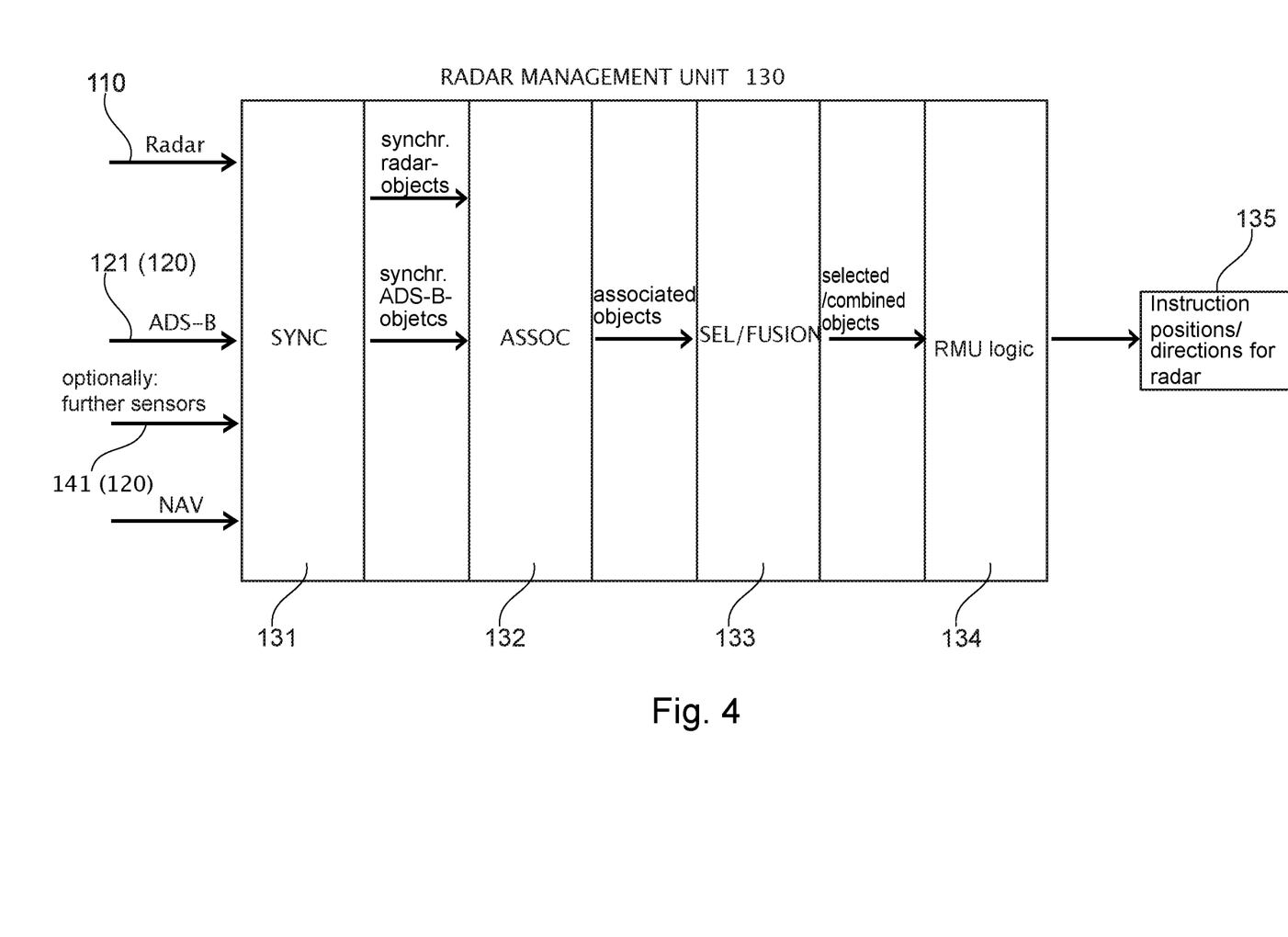
FIG. 4 illustrates further details of a radar management unit of the system in FIG. 3.

FIG. 4 shows further details of the radar management unit 130. The radar management unit 130 comprises, for example, a synchronization module 131, an association module 132, a selection module 133, and a processing unit (RME logic) 134. First, the synchronization module 131 receives the sensor signals from the exemplary radar unit 110, the ADS-B sensor 121, further optional sensors 141, and NAV data.

The synchronization module 131 first delivers all sensor data in a common coordinate system and then synchronizes the received signals (from one or more sensors) in order to be able to assign them to an object or a traffic participant 50. The assignment is performed by the association module 132, which, for example, receives the synchronized radar signals and the synchronized ADS-B signals, and assigns the different sensor signals to the individual objects 50. The assigned objects 50 are output to the selection module 133, which decides, which objects 50 have to be examined in more detail, in case they have not been detected and have a path, which may cause a potential risk (e.g., potential collision), for example. The selected objects are correspondingly analyzed in detail in the processing logic 134. The processing logic 134 determines, for example, object position data or at least directions to the objects 50 in order to forward instruction data to the radar 110 (via the feedback 135 in FIG. 3) based thereon. The position data may also identify the angular section 11, which has to be detected in a target way.

Thus, the radar management unit 130 performs the following steps one after another:
1) "SYNC": Incoming sensor data are generally output by the sensors in an asynchronous way. Thus, they first will be synchronized in time. This may be realized by using a Kalman filter, a simple time extrapolation or other techniques.
2) "ASSOC": The so-called association identifies individual aircrafts or other vehicles in the sensor data. This way it may, for example, be determined, whether an aircraft/vehicle, which has been reported by an ADS-B receiver or other sensors, has already been detected by radar. All possible matching sensor data records will be marked correspondingly in a database. Identical positions and speeds may be identified for example by using the Mahalanobis distance by taking the statistics covariances into account (the inverse covariance matrix serves as statistic distance metrics). In case several vehicles are found, which fulfill the Mahalanobis criteria (e.g., the Mahalanobis distance smaller than a threshold value), a decision is made for one of these vehicles. The decision may, for example, be made based on the nearest neighbor heuristics, according to which the algorithm decides for the data record having the smallest Mahalanobis distance. However, also other methods instead of the method based on the Mahalanobis distance, which has been described above by way of example, may be used.
3) "SEL/FUSION": A selection or data fusion may be performed when instructing the radar to a position, which is based on at least two sensors. To illustrate this case, an optional further sensor 141 has been indicated adjacent to the ADS-B input 121 in FIG. 4, that is without the optional further sensor the selection or data fusion may not take place. At selection time, one of the sensors is selected for instruction for each of the vehicles 50 to be analyzed. In case of a fusion, an algorithmic combination of the instruction position is performed, respectively.
4) "RME Logic": Here it is determined which targets have to be selectively irradiated by the radar. This routine will be explained below.

The determination of the radar targets, for which an instruction has to be performed, may be performed using an RME logic 134. As already described, the ASSOC block 132 continuously creates the complete list of associated vehicles. After an eventual selection or fusion, the RMD logic unit 134 performs then the following steps:
 a) Determining the candidate list for the radar targets 50, which have to be selectively irradiated,
 b) Evaluation of each element of the candidate list using a cost function (or processing of cost values, which have been calculated outside of the RME logic 134).
 c) Sorting the candidate list according to the determined cost value,
 d) Forwarding the maximum NSEL elements (e.g. 2, 3, 4, 5, . . . ) of the sorted candidate list to the radar.

The parameter NSEL depends on the available performance of the radar for the "cued search". It limits the number of radar targets, for which an instruction has to be performed.

During application of the cost function to the candidate list in step b), only those elements are taken into account, for example, which
 A) have been detected by at least one used sensor, and/or
 B) have not been confirmed by the radar, and/or
 C) have been/are detectable by means of an instructed radar.

Furthermore, the cost function may prioritize the elements selected in this way so that
 aircraft being located further away or aircraft having a smaller collision potential are assigned a lower priority, and/or
 for a larger number of unsuccessful trials, which are used to confirm the ADS-B positions and data of mode S or mode C by the radar, results in a lower priority.

According to this priorization, the list or database is sorted, and the NSEL elements having the highest priority are forwarded to the radar 110.

Exemplary embodiments thus use additional detected targets, wherein the gained additional position, speed and acceleration information is used to:
 extend the monitoring zone 115 of an existing collision avoidance system 400, as for example ACAS Xu (see FIG. 3),
 realize a new, integrated collision avoidance system, which includes an enlarged collision avoidance zone 215, and optionally provides a function for keeping the defined minimum values for the staggering distances between the vehicles.
 create an extended situation overview for the driver,
 create an indication regarding manipulated or false cooperating sensor data. The indication may be used by a driver and also by automatic monitoring/evasive action systems. Manipulated or false cooperating sensor data exist in case cooperating sensor data (position, speed, . . . ) may not be confirmed in the extended radar monitoring zone 215,
 to obtain an indication regarding inexact sensor data for the second detection device 120, in case it includes noncooperating sensors.

Figure 5:
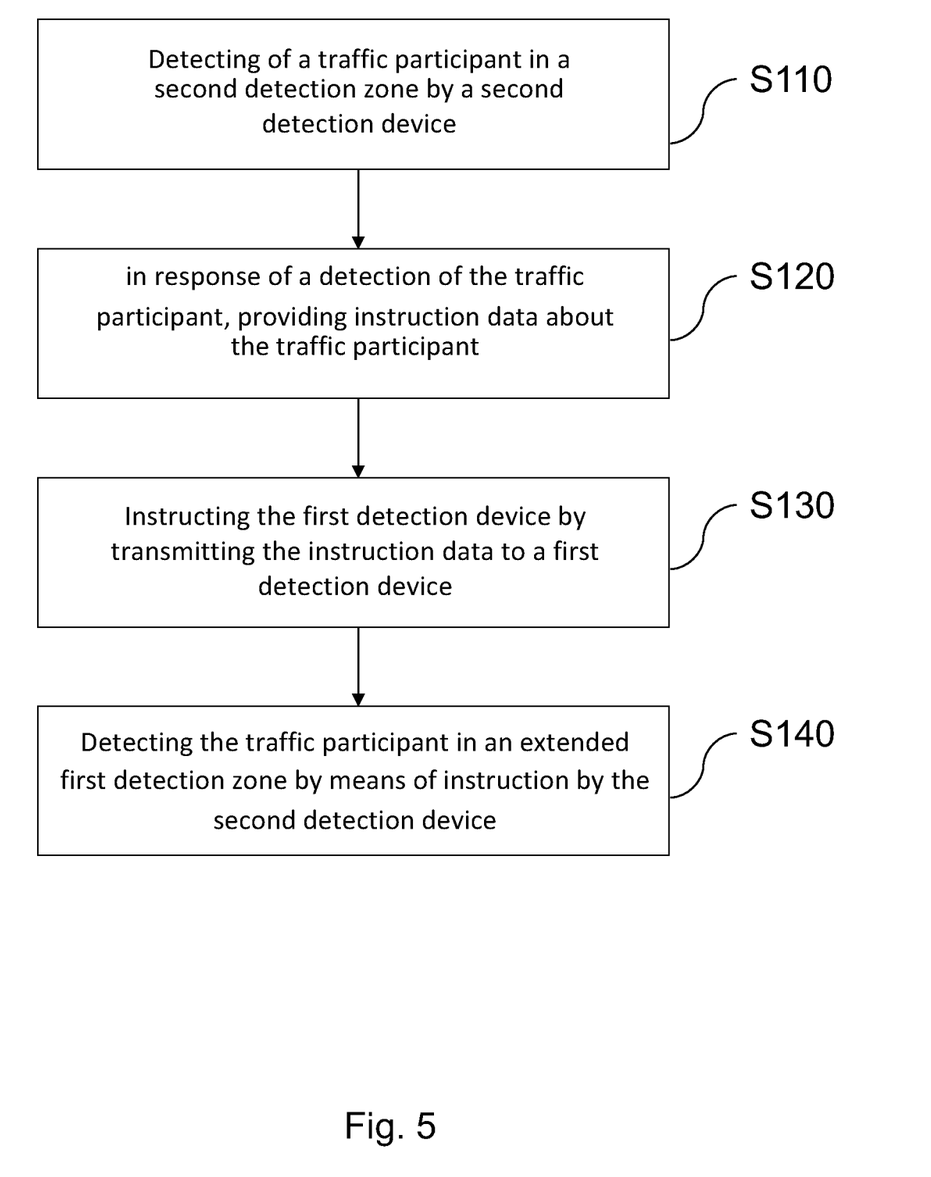
FIG. 5 illustrates an exemplary flow chart for a method to detect traffic participants according to an exemplary embodiment of the present invention.

FIG. 5 illustrates a flowchart of a method for detecting a traffic participant 50 including a detection apparatus, which comprises first and second detection devices 110, 120, wherein the first detection device 110 is able to repeatedly detect a first detection zone 115 and to detect an entering of a traffic participant 50 into the first detection zone 115. The method comprises the steps:
 Detecting S110 the traffic participant 50 in a second detection zone 125 by a second detection device 120;

In response to the detection of the traffic participant 50, providing S120 instruction data about the traffic participant 50;

Instructing S130 the first detection device 110 by transmitting the instruction data to the first detection device 110; and Detecting S140 the traffic participant 50 in an enlarged first detection zone 215 using the instruction by the second detection device 120, thus the traffic participant 50 may be detected before entering the first detection zone (115) by the first detection device (110).

The method may also be implemented on a computer, i.e. it may be realized by instructions, which are stored on a storage medium and which are able to perform the steps of the method, when they are executed on a processor. The instructions typically comprise one or more instructions, which may be stored in different ways on a variety of media in a controller (including a processor) or on a periphery of the controller, which after being read and executed by the controller, cause the controller to execute functions, functionalities, and operations that are required to execute a method according to the present invention.

The features of the invention disclosed in the description, the claims and in the figures may be realized individually and also in any combination, which is essential for the realization of the invention.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMBERS

R Trajectory of a traffic participant
10 Own vehicle
11 Angular section for instruction
50 Traffic participant
55 Collision avoidance zone
110 First detection device (e. g. radar)
115 First detection zone
120 Second detection device (e.g. ADS-B)
121 ADS-B sensor
125 Second detection zone
130 Controller (e.g. radar management unit)
131 Synchronization module
132 Association module
133 Selection module
134 Processing unit
135 Feedback
140 Transponder
141 Additional sensors
145 Additional sensor zone
215 Extended first detection zone
400 Collision avoidance system
410 Evaluation unit for cooperating sensors
420 Further evaluation unit for non-cooperating sensors
430 Correlation processing unit
440 Calculation unit
500 Collision avoidance action

What is claimed is:

1. An apparatus for detecting at least one participant, the apparatus comprising:
a first detection device configured to detect the at least one traffic participant in a first detection zone, wherein the first detection device is configured to
repeatedly scan the first detection zone and to detect an entering of the at least one traffic participant in the first detection zone, and
to detect the at least one traffic participant, based on an instruction, in an angular section in an enlarged first detection zone beyond the first detection zone; and
a second detection device configured to detect the at least one traffic participant in a second detection zone, wherein the second detection device, responsive the detection of the at least one traffic participant, is configured to provide data needed for the instruction regarding the at least one traffic participant and to transmit the data to the first detection device for the instruction, so that the at least one traffic participant is detectable by the first detection device before entering the first detection zone,
wherein the second detection device comprises at least one cooperative sensor configured to detect a position of the at least one traffic participant based on data sent by the at least one traffic participant.

2. The apparatus of claim 1, wherein the data used for the instruction indicate a direction towards the at least one traffic participant or the position of the at least one traffic participant, and the angular section is selected in a way that the direction or the position is inside the angular section, wherein the at least one traffic participant is located outside of the first detection zone.

3. The apparatus of claim 1, wherein the second detection device comprises at least one non-cooperative sensor configured to detect the at least one traffic participant independent of whether the at least one traffic participant sends data.

4. The apparatus of claim 1, wherein the first detection device comprises a non-cooperative sensor, which is a radar having an electronic beam swiveling and which is configured to detect the at least one traffic participant independent of whether the at least one traffic participant is sending data or not.

5. The apparatus of claim 1, further comprising:
a controller configured to provide at least one of the following:
synchronizing detection signals of the first detection device and/or of the second detection device in time,
assigning traffic participants to the detected detection signals,
providing a selection or data fusion of the data used for the instruction, in case the second detection device comprises at least two sensors, supplying sensor data,
selecting traffic participants, which may be selectively detected by the first detection device in the angular section.

6. The apparatus of claim 5, wherein the controller is further configured to determine candidate traffic participants for which an instruction is to be performed, wherein the determination comprises at least one of the following:
    determining a candidate list for candidates for which an instruction is to be selectively performed,
    evaluating each element of the candidate lists using a cost function,
    sorting the candidate list based on the evaluation,
    forwarding candidates that are most weighted by the cost function to the first detection device in order to perform an instruction regarding the most weighted candidates.

7. The apparatus of claim 1, further comprising:
    a warning device configured to display the at least one traffic participant that has been detected by the first detection device in the enlarged first detection zone, as a warning.

8. The apparatus of claim 7, wherein the warning device comprises a display configured to display the at least one traffic participant upon detection in the enlarged first detection zone.

9. The apparatus of claim 8, wherein the at least one traffic participant is an aircraft, a water vehicle, or a land vehicle and a collision avoidance system proposes alternative routes and/or initiates them in an autonomous way based on the detection.

10. A method for detecting a traffic participant using a detection apparatus comprising first and second detection devices, wherein the first detection device is able to repeatedly scan a first detection zone and to detect an entering of the traffic participant in the first detection zone, the method comprising:
    detecting the traffic participant in a second detection zone by the second detection device, wherein the second detection device comprises at least one cooperating sensor;
    detecting, by the second detection device, a position of the traffic participant based on data sent by the traffic participant;
    providing instruction data about the traffic participant responsive to the detection of the traffic participant;
    instructing the first detection device by transmitting the instruction data to the first detection device; and
    detecting the traffic participant by the first detection device in the extended first detection zone responsive to the instruction so that the traffic participant is detectable by the first detection device before entering the first detection zone.

11. The method of claim 10, further comprising at least one of the following steps:
    synchronizing detection signals from the first detection device and/or from the second detection device;
    assigning traffic participants to the detected detection signals;
    when the second detection device comprises at least two sensors providing detection data, selecting and/or combining of the data used for instruction; and
    selecting traffic participants, that are to be selectively detectable by the first detection device in a limited angular section.

12. The method of claim 10, further comprising at least one of the following steps:
    creating a candidate list for candidates of traffic participants for which an instruction has to be selectively performed;
    evaluating each element from the candidate list using a cost function;
    sorting the candidate list based on the evaluation; and
    forwarding candidates that are most weighted by the cost function to the first detection device to perform an instruction to the traffic participants.

13. A non-transitory computer program product for detecting a traffic participant using a detection apparatus comprising first and second detection devices, wherein the first detection device is able to repeatedly scan a first detection zone and to detect an entering of the traffic participant in the first detection zone, wherein the non-transitory computer program product stores instructions, which when executed by a processor cause the processor to:
    detect the traffic participant in a second detection zone by the second detection device, wherein the second detection device comprises at least one cooperating sensor;
    detect, by the second detection device, a position of the traffic participant based on data sent by the traffic participant;
    provide instruction data about the traffic participant responsive to the detection of the traffic participant;
    instruct the first detection device by transmitting the instruction data to the first detection device; and
    detect the traffic participant by the first detection device in the extended first detection zone responsive to the instruction so that the traffic participant is detectable by the first detection device before entering the first detection zone.

* * * * *